UNITED STATES PATENT OFFICE.

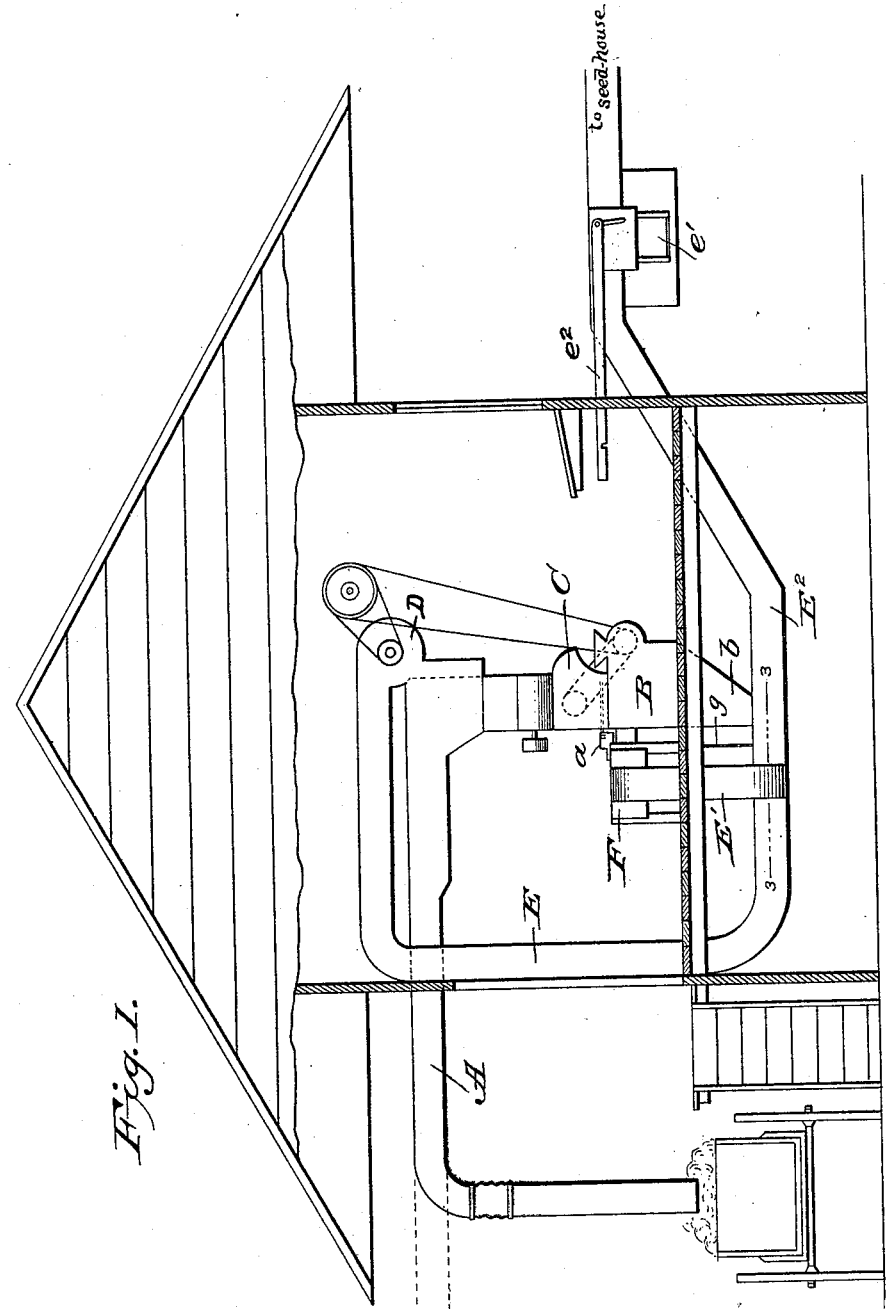

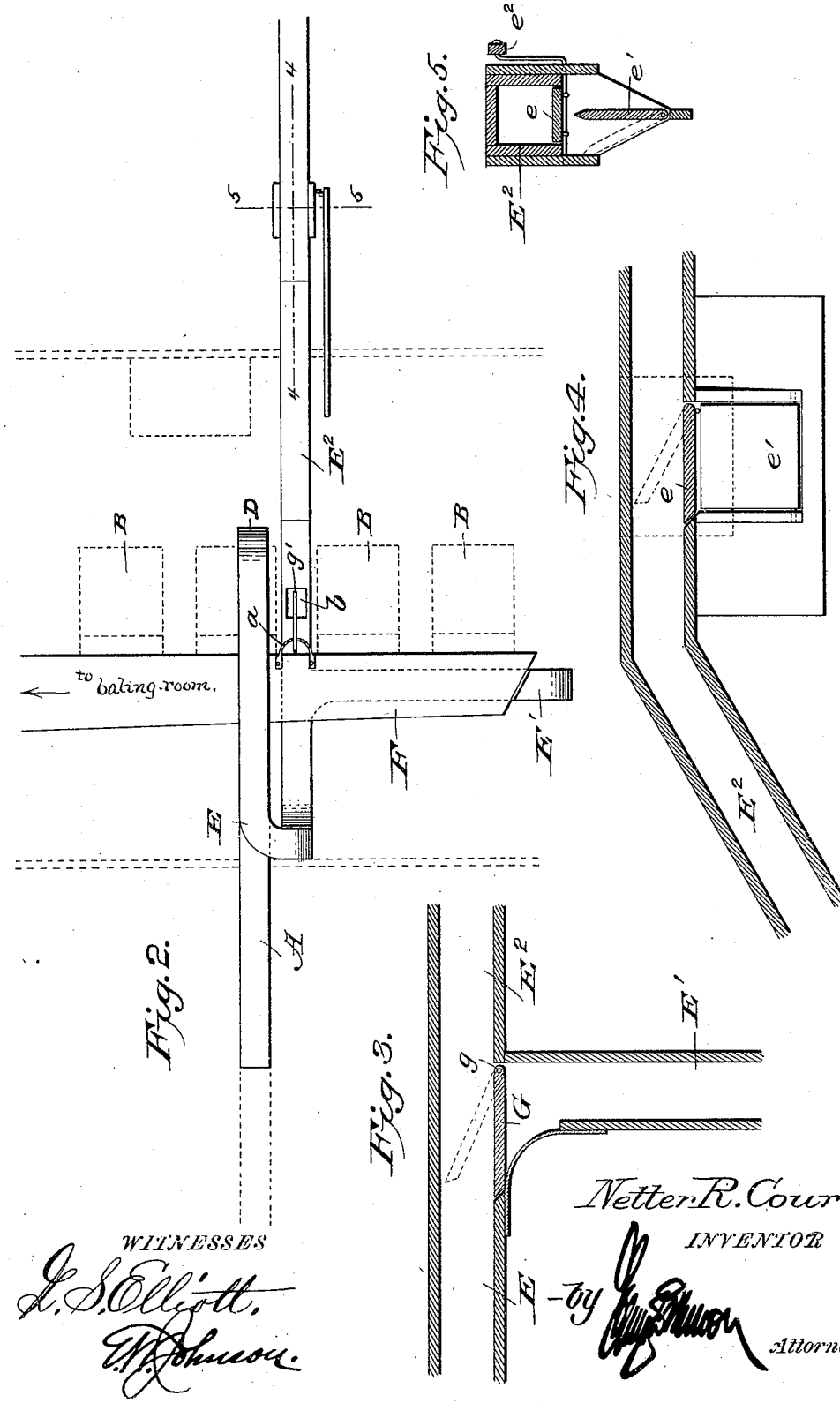

NETTER R. COURSEY, OF BLOSSOM, TEXAS.

ATTACHMENT FOR GINNING-MACHINES.

SPECIFICATION forming part of Letters Patent No. 589,339, dated August 31, 1897.

Application filed May 7, 1896. Serial No. 590,552. (No model.)

*To all whom it may concern:*

Be it known that I, NETTER R. COURSEY, a citizen of the United States of America, residing at Blossom, in the county of Lamar and State of Texas, have invented certain new and useful Improvements in Attachments for Ginning-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my invention is to provide mechanical means for conveying the cotton and seed that is delivered from the gins through pneumatic tubes to the baling-room and seed-house, respectively, said pneumatic conveyers being connected to the fan that delivers the seed-cotton to the gins, so that the excess of air from said fan can be utilized in handling the cotton and seed after it passes from the ginning mechanism, the parts being so constructed and arranged that the blast from the fan can be directed into both of the conveyers or concentrated into one to clean the same should it become choked.

The invention is designed more particularly as an improvement upon what is known as the "Munger" system of handling cotton and feeding the same to the gins.

My invention consists in the novel arrangement of pneumatic tubes for conveying the cotton and seed from the gins, including deflectors for properly delivering said seed and cotton, as will be hereinafter fully set forth, and particularly pointed out in the claim.

In the accompanying drawings, forming part of this specification, Figure 1 is a side elevation showing the application of my invention to gins and feeders of ordinary construction. Fig. 2 is a plan view of my improvements. Fig. 3 is a horizontal sectional view on the line 3 3 of Fig. 1. Fig. 4 is a vertical sectional view on the line 4 4 of Fig. 2, and Fig. 5 is a transverse sectional view on the line 5 5 of Fig. 2.

A designates a pneumatic tube through which the seed-cotton is delivered to the gins B by way of the feeders C, said gins and feeders being of the ordinary construction.

Within the tube or conveyer A is located a fan D, which draws the seed-cotton through said tube or conveyer and delivers it upon the feeders, the excess of air of said fan being directed into a tube E, which extends below the floor that supports the gins and is provided with branch tubes E' and E². The branch tube E' leads to a trunk or casing F, that receives the cotton from the gins, while the branch tube E² extends to the seed-house and at an intermediate point communicates with a chute b, into which the seed is delivered from the gins. By this arrangement the excess of air from the fan D will be forced into the main tube E, and from there into the branch tubes E' and E², the air from the tube E' conveying the cotton to the baling-room, (not shown,) while the air in the tube E² conveys the seed that is deposited therein from the chute b to the seed-house.

At the point where the branch tubes E' and E² join the main tube E is located a damper or cut-off G, as shown in Fig. 3, which may be swung to permit the air to pass into both branch tubes or moved to cut off either one of said branch tubes, so that the full blast of air can be directed into one of them for the purpose of cleaning it out should the same become choked from any cause. This damper is operated by a stem g, having a handle g', which engages a segment-rack a to hold said cut-off in an adjusted position. The operating-handle for the cut-off is located in the room with the gins, so that it may be operated by the attendant stationed in that room.

The branch tube E² is provided at a point between the gin-house and seed-house with suitable mechanism by which the seed can be deposited into a wagon or other receptacle, said mechanism consisting of a hinged cut-off e, which directs the seed upon a deflector e', from which it falls into the wagon or receptacle. When bags are used to receive the seed, the deflector e' can be turned to one side to fill one of the bags and to the other side to fill the second while the first is being removed and another substituted. The cut-off e is connected to a crank-shaft provided with a lever e², by which said cut-off may be operated from the gin-house.

The mechanism herein shown and described provides for utilizing the excess of air from the fan that conveys the seed-cotton to the gins to deliver the cotton and seed to suitable points for handling the same, and also provides means for directing the full blast to remove any choking that may occur, thereby assisting the gin-brushes to deliver the cotton.

Having thus described my invention, what I claim as new, and desire to secure by Letters Patent, is—

In a seed-cotton conveyer and separator, the combination of the pneumatic tube A, gins B, and feeders C, a fan positioned at one end of the tube A, a tube E, connected with the fan-casing, branch tubes E' E², a cut-off or damper G, at the intersection of the branch tubes with the tubes E, a trunk or casing F, connected with the several gins and with the branch tube E', said trunk communicating with the baling-room, means for establishing communication between the gins and the branch tube E² positioned to one side of the branch tube E' so that the seed will be delivered thereto, said tube leading to the seed-house and provided between said house and gin-room with a discharge-opening and a closure therefor and an operating-arm for said closure extending therefrom to a point within the room containing the gin substantially as shown and for the purpose set forth.

In testimony whereof I affix my signature in presence of two witnesses.

NETTER R. COURSEY.

Witnesses:
 W. L. WILLIAMS,
 G. B. LAWRANCE.